United States Patent
Amano (10) Patent No.: US 8,358,369 B2
(45) Date of Patent: Jan. 22, 2013

(54) IMAGING DEVICE WITH PLURAL ROTATING SHUTTERS FOR VARYING A FRAME CYCLE

(75) Inventor: Ryosuke Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 375 days.

(21) Appl. No.: 12/503,891

(22) Filed: Jul. 16, 2009

(65) Prior Publication Data
US 2010/0013982 A1 Jan. 21, 2010

(30) Foreign Application Priority Data

Jul. 18, 2008 (JP) ............................. P2008-187842

(51) Int. Cl.
*H04N 5/238* (2006.01)
(52) U.S. Cl. ........ 348/368; 348/362; 348/367; 396/169; 396/246; 396/497; 352/208; 352/209
(58) Field of Classification Search .................. 348/367, 348/368; 396/497–500; 352/216, 208, 209
See application file for complete search history.

(56) References Cited

U.S. PATENT DOCUMENTS

| | | | |
|---|---|---|---|
| 4,257,693 A | 3/1981 | Hirata et al. | |
| 4,322,140 A | 3/1982 | Takimoto et al. | |
| 4,504,866 A * | 3/1985 | Saito | 348/230.1 |
| 4,532,550 A * | 7/1985 | Bendell et al. | 348/230.1 |
| 4,551,763 A | 11/1985 | Swinehart et al. | |
| 4,576,456 A * | 3/1986 | Okino et al. | 352/216 |
| 4,592,632 A * | 6/1986 | Renold | 352/214 |
| 4,597,015 A * | 6/1986 | Johnson | 348/230.1 |
| 4,626,094 A * | 12/1986 | Saito | 396/256 |
| 4,643,548 A | 2/1987 | Swinehart | |
| 4,889,424 A * | 12/1989 | Saiki | 352/216 |
| 6,757,021 B1 * | 6/2004 | Nguyen-Nhu | 348/362 |
| 7,276,686 B2 | 10/2007 | Haubmann | |
| 2003/0164893 A1 * | 9/2003 | Mayhew | 348/368 |
| 2005/0220447 A1 * | 10/2005 | Ito | 396/17 |
| 2010/0013946 A1 * | 1/2010 | Amano | 348/222.1 |
| 2010/0013971 A1 * | 1/2010 | Amano | 348/296 |

FOREIGN PATENT DOCUMENTS

| | | |
|---|---|---|
| JP | 54 108631 | 8/1979 |
| JP | 61 51133 | 3/1986 |
| JP | 2006-308841 | 11/2006 |

* cited by examiner

*Primary Examiner* — Sinh Tran
*Assistant Examiner* — Paul Berardesca
(74) *Attorney, Agent, or Firm* — Frommer Lawrence & Haug LLP; William S. Frommer; Thomas F. Presson (57) ABSTRACT

Disclosed herein is an imaging device including an imaging element, an imaging controller, first and second shutter members, and a shutter controller. The imaging element carries out photoelectric conversion of subject image light incident through a lens and produces an imaging signal. The imaging controller controls readout of the imaging signal and carries out control of change setting of a frame cycle of imaging. The shutter members are disposed on an optical path of image light incident and can set a state in which incident light on the imaging element is blocked and a state in which incident light on the imaging element is not blocked. The shutter controller sets a timing at which the optical path is blocked by the first shutter member and a timing at which the optical path is blocked by the second shutter member.

5 Claims, 10 Drawing Sheets

IMAGING DEVICE WITH PLURAL ROTATING SHUTTERS FOR VARYING A FRAME CYCLE

BACKGROUND OF THE INVENTION

1. Field of the Invention

The present invention relates to an imaging device formed as a video camera, and particularly to an imaging device that carries out imaging with combination of a mechanical shutter and an electronic shutter.

2. Description of the Related Art

In an imaging device employing a frame-transfer (FT) charge coupled devices (CCD) image sensor as its imaging element, the image area (light receiving part) is shielded from light during signal charge readout. Furthermore, in an imaging device employing a complementary metal oxide semiconductor (CMOS) image sensor, the image area is shielded from light during charge readout in order to achieve simultaneity of signal charge accumulation.

A scheme of using a rotary shutter is known as a method for shielding the image area from light. The rotary shutter is obtained by providing a shutter blade that is driven to rotate by a motor between an imaging lens and the imaging element. The rotary shutter is so configured as to be capable of setting the state in which the optical path is blocked and the state in which the optical path is not blocked depending on the rotational angular position of the shutter blade.

Furthermore, at the timing of the state in which the shutter blade blocks the optical path and light is not incident on the light receiving part of the imaging element, a signal accumulated in the light receiving part is read out. Thereby, unnecessary exposure of the FT CCD image sensor in the middle of the transferring of the light reception signal is prevented. Details of the state of the linkage between the rotation of the shutter blade and the drive timing of the imaging element will be described later in the description of an embodiment of the present invention.

Japanese Patent Laid-Open No. 2006-308841 (Patent Document 1) discloses an example of a shutter device that controls the period of the incidence of light to the imaging plane of a solid-state imaging element and the period of blocking of light to the imaging plane.

Japanese Patent Laid-Open No. Sho 54-108631 (Patent Document 2) discloses an example in which three shutter blades are employed to widen the variable range of the light-blocking range.

If light blocking and exposure for an imaging element are alternately carried out by rotating one shutter blade, a problem arises that the timing of the light blocking is settled in a somewhat fixed manner and the flexibility in the shutter speed, which corresponds to the accumulation period of the charge for obtaining the image signal of one frame, is limited.

Specifically, e.g. the following case is assumed. A shutter blade is so configured that light is blocked in a 180°-angle range of the blade and light is not blocked in the remaining 180°-angle range. In addition, the shutter blade is rotated one revolution per one frame. In this case, the maximum period during which the imaging element can receive light within one frame is a period about half the one-frame period, and it may be impossible to expose the imaging element for a period longer than this maximum period.

It is possible to extend the exposure period within the one-frame period by setting the angle range of light blocking by the shutter blade smaller than 180°. However, if the angle range of light blocking by the shutter blade is set smaller, the period during which light is blocked within the one-frame period is also correspondingly shortened, which causes a possibility that the light-blocking period is insufficient to read out the signal obtained in the imaging element.

In particular, in recent years, there are an increasing number of occasions where photographing is carried out by a photographic method called variable speed ramping with this kind of video camera. The variable speed ramping refers to a way in which photographing is carried out with the frame rate (frame per second, hereinafter referred to as the FPS) smoothly changed differently from photographing with a fixed number of frames per second, such as 30 frames per second for video for television broadcasting and 24 frames per second for video for a film.

For example, if a walking person is photographed by the variable speed ramping and the obtained video is reproduced with a fixed number of frames, sharp video representation is possible, such as video representation in which this person walks slowly when waking on the far side but quickly passes on the near side suddenly. A user is often allowed to change the FPS in real time by operating a user interface (UI) such as a jog dial. In addition, e.g. a scheme of programming a FPS change curve in advance and executing the program is also employed.

In such variable speed ramping, the shutter blade is often an obstacle depending on the setting of the cycle of the imaging.

There is a desire for the present invention to allow an imaging element to be favorably shielded from light by a mechanical shutter while keeping the flexibility in the frame cycle, the shutter speed, and the exposure time.

SUMMARY OF THE INVENTION

According to an embodiment of the present invention, there is provided an imaging device including an imaging element configured to carry out photoelectric conversion of subject image light incident through a lens and produce an imaging signal, and an imaging controller configured to control readout of the imaging signal from the imaging element and carry out control of change setting of the frame cycle of imaging by the imaging element.

Furthermore, first and second shutter members are prepared. They are disposed on the optical path of image light incident through the lens and are each capable of setting a state in which incident light on the imaging element is blocked and a state in which incident light on the imaging element is not blocked. In addition, a shutter controller for controlling the first and second shutter members sets the timing at which the optical path is blocked by the first shutter member and the timing at which the optical path is blocked by the second shutter member based on the imaging timing set by the imaging controller.

Due to this configuration, the flexibility in setting of the period and timing of the blocking of the optical path by the shutter members is enhanced through the setting of the condition of the blocking of the optical path by two shutter members in the shutter controller. For example, by adjusting the angle formed by two shutter members to thereby set the light-blocking angle small, the period during which light is not blocked by the shutter members in the one-frame imaging period is increased. That is, the so-called shutter speed can be set low. On the other hand, by adjusting the angle formed by two shutter members to thereby set the light-blocking angle large, the period during which light is blocked by the shutter members in the one-frame imaging period is increased, which allows light blocking corresponding to a high shutter speed. Therefore, the configuration according to the embodiment of the present invention is suitable for an imaging device that can carry out change setting of the frame rate and exposure time of imaging by an imaging element.

In the embodiment of the present invention, because of the configuration that allows adjustment of the condition of blocking of the optical path to the imaging element by two shutter members, the ratio between the light-blocking time and the exposure time can be adjusted, which can freely set a state suitable for the frame rate, the shutter speed, and so on at that time. In particular, if an electronic shutter is also used, the exposure aperture angle can be changed in a wide adjustment range of 0° to 270° even with two shutter members that offer the benefit of simultaneity of the exposure by the mechanical shutter. In the related art, three or more shutter members are needed in order to obtain the adjustment range of the exposure aperture angle above the range of 0° to 180°. In contrast, the embodiment of the present invention can simplify the configuration.

Because the configuration can be simplified, cost reduction, weight reduction, and reliability enhancement for the imaging device can be correspondingly achieved. Furthermore, simplification and weight reduction of the structure of the rotational part can reduce the power necessary for the rotational driving, which can achieve reduction in the power consumption of the imaging device. Moreover, it is also possible to easily handle sudden change in the frame cycle, which can widen the range of the video representation.

DETAILED DESCRIPTION OF THE PREFERRED EMBODIMENTS

One embodiment of the present invention will be described below in the following order with reference to the accompanying drawings.

Figure 1:
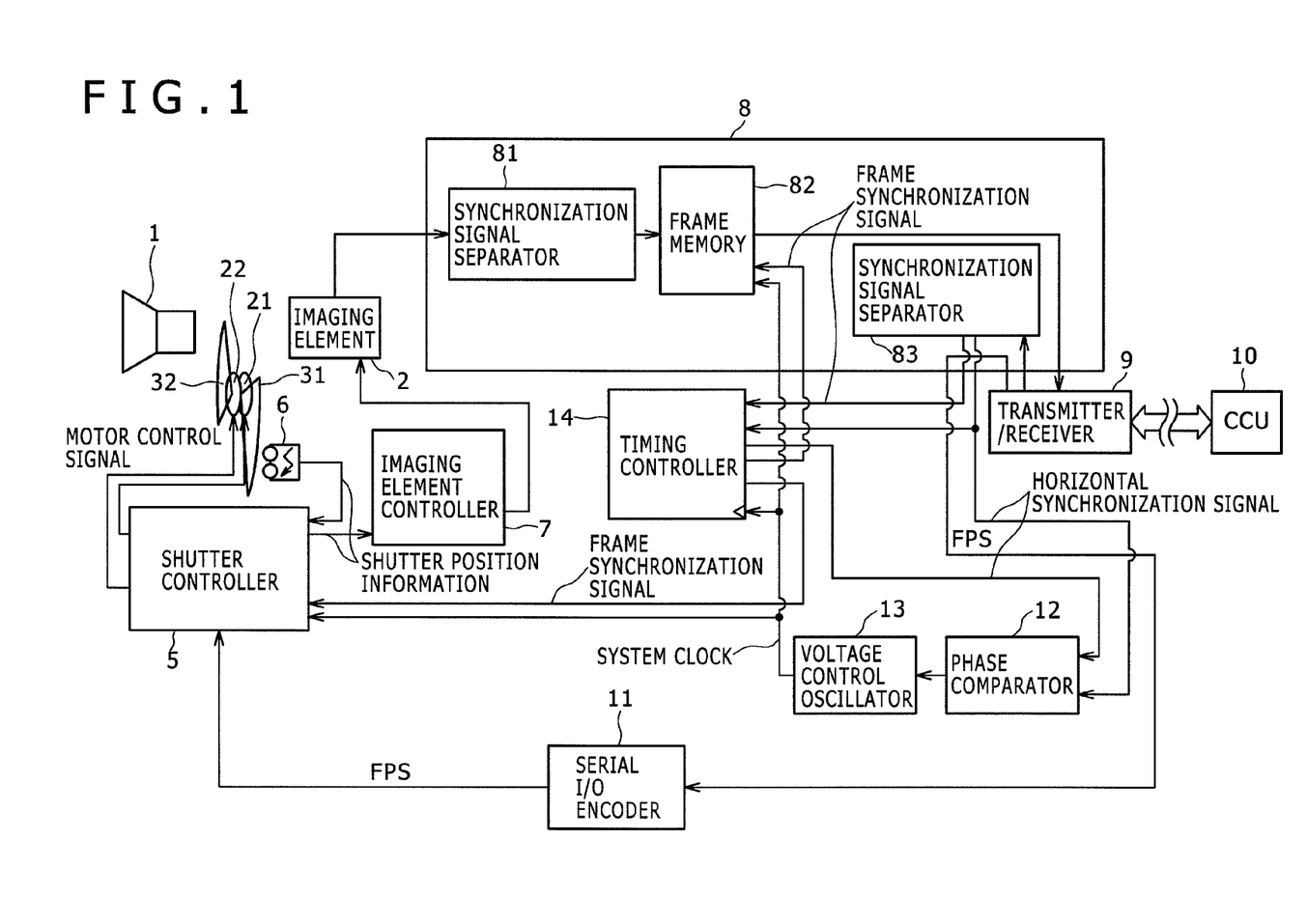
FIG. 1 is a block diagram showing a configuration example of a system according to one embodiment of the present invention.

1. Entire Configuration Example of Imaging Device (FIG. 1)

2. Description of Shutter Mechanism as Premise (FIGS. 7 to 10D)

3. Description of Shutter Mechanism of Present Embodiment (FIGS. 2 to 4C)

4. Examples of Imaging State of Present Embodiment (FIGS. 5A to 5F and FIGS. 6A to 6E)

5. Description of Modification Examples of Embodiment

[Entire Configuration Example of Imaging Device]

FIG. 1 is a diagram showing a configuration example of an imaging device according to the present embodiment. The imaging device of the present embodiment is connected to a camera control unit 10 (hereinafter, referred to as the CCU 10). A video signal and a control signal are exchanged between the imaging device and the CCU 10 based on e.g. the high definition-serial digital interface (HD-SDI) standard.

The frame synchronization frequency corresponding to the frame cycle of imaging by the imaging device is determined by a signal transmitted from the CCU 10. This frame synchronization frequency is used not only in the imaging device but also in a recording/reproducing device and a display device (neither of them is shown) connected to the imaging device, in a unified manner.

Information on the frame rate (FPS) of imaging by an imaging element 2 is also transmitted from the CCU 10.

If the frame synchronization frequency is defined as P_F, the frame synchronization frequency P_F and the FPS are used with the relationship shown below.

$$P\_F \geq FPS$$

For example, in the case of an imaging device that can be driven with 240 P (240 frames/s progressive), the frame synchronization frequency is set to 240 P. In this case, the value of the FPS is set to any value in the range of 1 to 240 P by a user. The phase relationship between the frame synchronization frequency P_F and a video signal can be fixed to a certain phase relationship when P_F is equal to the FPS. However, the phase relationship may not be locked when P_F is not equal to the FPS. That is, the phase relationship may be regarded as indefinite in general, and the value of the FPS can be freely set within a range below the frame synchronization frequency P_F without being restricted by P_F.

The imaging device shown in FIG. 1 includes a lens 1, the imaging element 2 that carries out photoelectric conversion of subject image light incident through the lens 1 to thereby produce a video signal, and shutter blades 31 and 32 for carrying out exposure and light blocking for the image area of the imaging element 2 with predetermined intervals. As the shutter blades 31 and 32, the first shutter blade 31 and the second shutter blade 32 are provided. The angle formed by these two shutter blades 31 and 32 can be adjusted.

The first shutter blade 31 is driven to rotate by a first motor 21. The second shutter blade 32 is so configured that the angle formed with the first shutter blade 31 is set by a second motor 22. Details of the respective shutter blades 31 and 32 and the peripheral configuration thereof will be described later.

The rotational angular positions of the respective shutter blades 31 and 32 are detected by a shutter position detector 6. For the shutter position detector 6, e.g. a reflective film with a predetermined pattern is provided around the shutter blades 31 and 32, and light is emitted onto the reflective film. The shutter position detector 6 detects returned light of the emitted light to thereby detect the rotational angular positions. It is also possible to employ a configuration in which the rotational angular position of the first shutter blade 31 is detected by the shutter position detector 6 and the rotational angular position of the second shutter blade 32 is detected by another sensor or mechanism.

The driving of the first motor 21 and the second motor 22 is controlled by a shutter controller 5. Information on the rotational angles of the shutter blades 31 and 32, detected by the shutter position detector 6, is supplied to the shutter controller 5.

The imaging device further includes an imaging element controller 7 that controls the operation of the imaging element 2, a signal processor 8, a transmitter/receiver 9, a serial input/output (I/O) encoder 11, a phase comparator 12, a voltage control oscillator 13, and a timing controller 14. The imaging element controller 7 carries out imaging by the imaging element 2 with the frame cycle and the timing indicated by the shutter controller 5. An imaging signal obtained by the imaging element 2 is supplied to the signal processor 8.

The signal processor 8 executes, for the imaging signal read out from the imaging element 2, clamp processing for fixing the black level of the signal of the respective pixels at a constant reference value, edge enhancement processing for highlighting the contours, gamma correction for adjusting the gamma value in matching with the gamma characteristic of the display device, and so on. The signal resulting from the signal processing is transmitted as a video signal in a predetermined format from the transmitter/receiver 9 to the external.

The signal processor 8 has, in addition to the module for these kinds of processing, a synchronization signal separator 81 that separates a synchronization signal from a video signal output from the imaging element 2, a frame memory 82 that stores the video signal corresponding to one screen, and a synchronization signal separator 83 that separates a synchronization signal superimposed on return video transmitted from the CCU 10.

The synchronization signal separator 81 produces a synchronization signal by separating synchronization codes, such as SAV (start of active video) and EAV (end of active video), superimposed on an input video signal, and supplies the video signal and the synchronization signal to the frame memory 82. The frame memory 82 is formed of e.g. an asynchronous first-in first-out (FIFO) memory, and writes the video signal in such a manner as to keep frame synchronization by the synchronization signal supplied from the synchronization signal separator 81.

On the other hand, readout of the video signal from the frame memory 82 is carried out in synchronization with a frame synchronization signal supplied from the CCU 10. Details of the processing at the time of the readout of the video signal will be described later.

The transmitter/receiver 9 converts the video signal output from the frame memory 82 in the signal processor 8 to a frequency multiplexed signal such as an HD-SDI signal and transmits the signal to the CCU 10. In addition, the transmitter/receiver 9 executes encoding processing of encoding a frequency multiplexed signal transmitted from the CCU 10. The transmitter/receiver 9 outputs a video signal obtained through the encoding to the synchronization signal separator 83 and outputs serial data in which FPS information and so on is described to the serial I/O encoder 11. The serial I/O encoder 11 writes the input serial data to the module that may require the information of the serial data. When FPS information is transmitted as the serial data, the serial I/O encoder 11 supplies the FPS information to the shutter controller 5.

The synchronization signal separator 83 separates synchronization codes, such as SAV and EAV, superimposed on the video signal to thereby extract a horizontal synchronization signal H and a frame synchronization signal F. The synchronization signal separator 83 outputs the extracted horizontal synchronization signal H to the timing controller 14 and the phase comparator 12 and outputs the frame synchronization signal F to the timing controller 14. The timing controller 14 produces a free-running horizontal synchronization signal PH having the same cycle as that of the horizontal synchronization signal H supplied from the synchronization signal separator 83 and outputs it to the phase comparator 12.

The phase comparator 12 detects the phase difference between the horizontal synchronization signal H input from the synchronization signal separator 83 and the free-running horizontal synchronization signal PH input from the timing controller 14. The phase comparator 12 produces the voltage dependent on the detected phase difference and supplies the voltage to the voltage control oscillator 13. The voltage control oscillator 13 changes the oscillation frequency depending on the supplied voltage to thereby carry out such adjustment as to eliminate the phase difference between the horizontal synchronization signal H input from the synchronization signal separator 83 and the free-running horizontal synchronization signal PH. Furthermore, the voltage control oscillator 13 outputs a system clock CK having such an oscillation frequency that the phase is locked to the horizontal synchronization signal H to the timing controller 14, the frame memory 82, and the shutter controller 5.

To the timing controller 14, the frame synchronization signal F separated by the synchronization signal separator 83 is also input. That is, the timing controller 14 operates in synchronization with not only the horizontal synchronization signal H transmitted from the CCU 10 but also the frame synchronization signal F. Furthermore, the timing controller 14 supplies a horizontal synchronization signal PLH and a frame synchronization signal PLF resulting from phase adjustment to the frame memory 82 and the shutter controller 5.

[Description of Shutter Mechanism as Premise]

Before describing the structure of the shutter blades 31 and 32 shown in FIG. 1, the premise structure to control imaging by this kind of imaging device by using two shutter blades will be described below with reference to FIGS. 7 to 10D.

Figure 7:
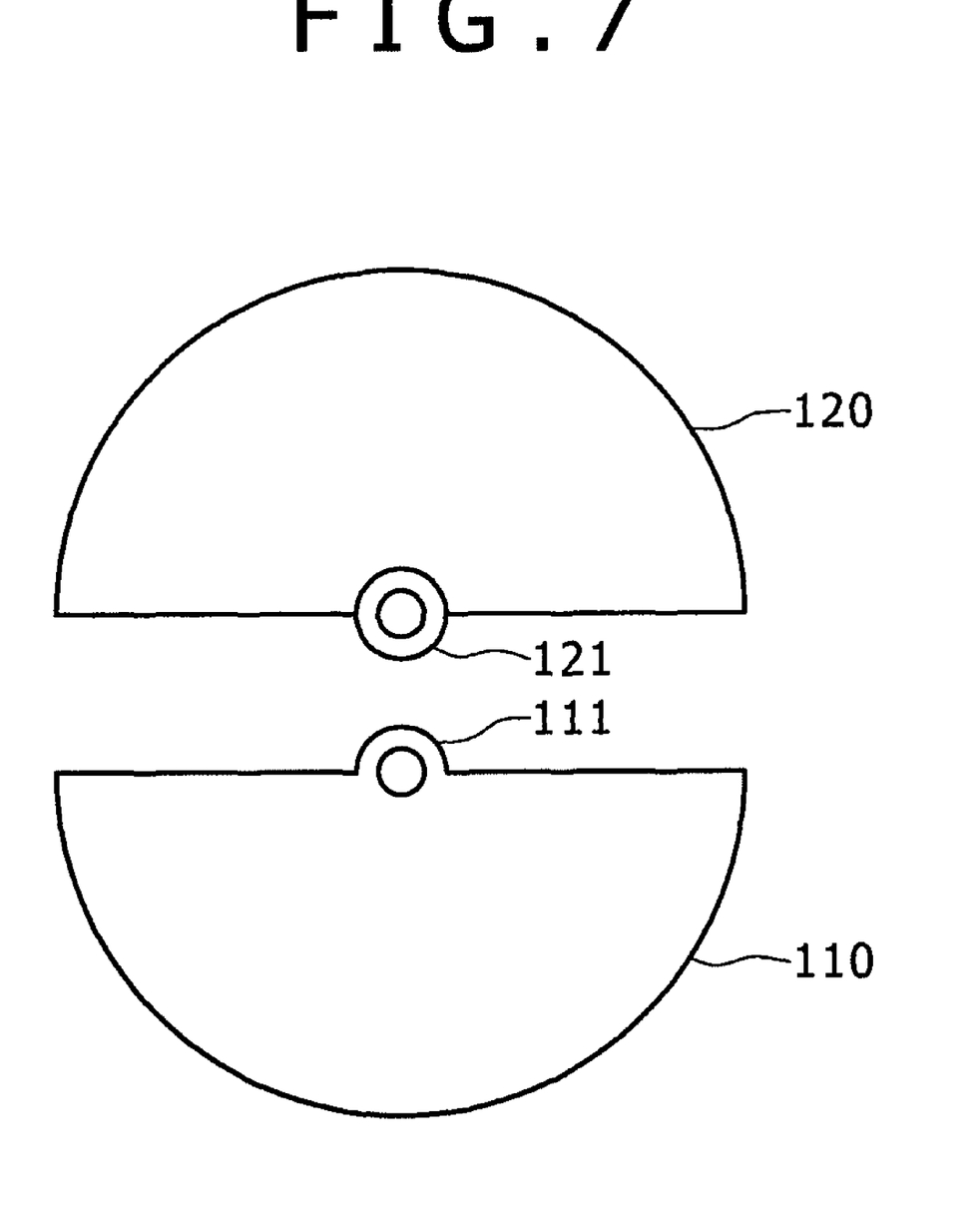
FIG. 7 is an explanatory diagram showing an example of shutter blades with a premise structure for embodiments of the present invention.

FIG. 7 shows a general structure example obtained with two shutter blades of this kind.

Specifically, a first shutter blade 110 and a second shutter blade 120 each having a semicircular shape (i.e. having a light-blocking angle of 180°) are prepared. A rotation shaft is inserted into center parts 111 and 121 of the shutter blades 110 and 120, and the shutter blades are driven to rotate by a motor (not shown). The angle formed by two blades 110 and 120 can be adjusted.

Figure 8A:
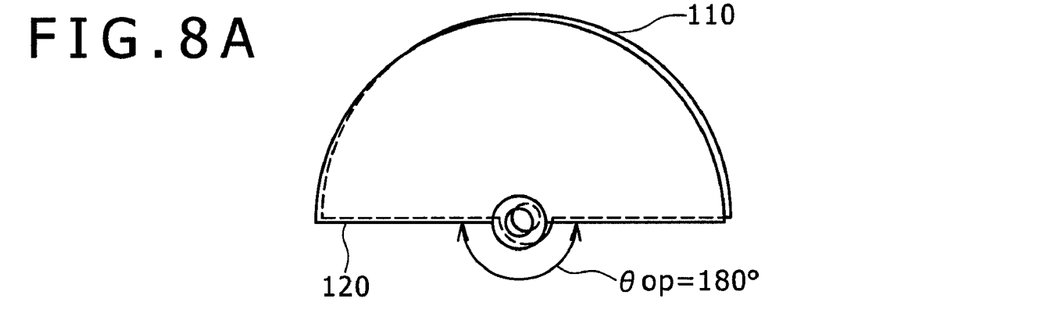
FIGS. 8A to 8C are explanatory diagrams showing examples of the angle formed by the shutter blades of FIG. 7.
Figure 8B:
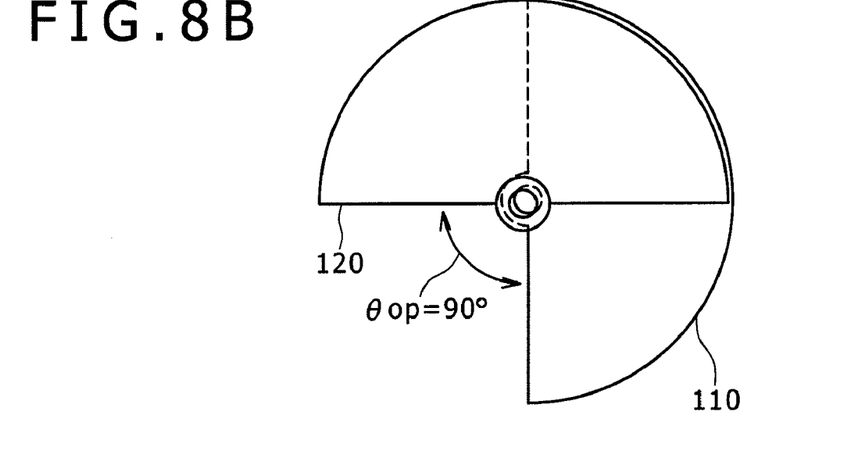
Figure 8C:
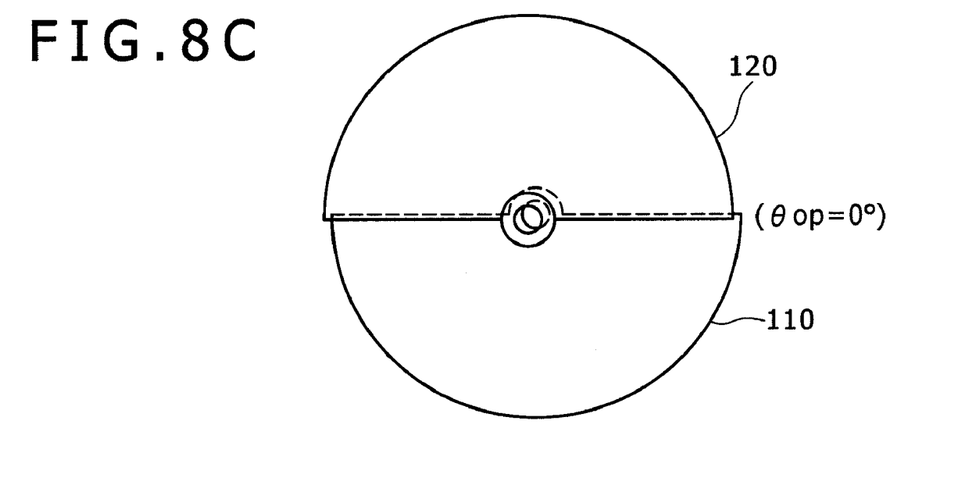

Examples in which the light-blocking angle and the aperture angle are changed by these shutter blades 110 and 120 are shown in FIGS. 8A to 8C. In FIGS. 8A to 8C, two shutter blades 110 and 120 are so shown as to be slightly shifted from each other for the description. However, they are disposed on the same axis in practice.

FIG. 8A shows an example in which two shutter blades 110 and 120 are so overlapped as to have the same angle range. If two shutter blades 110 and 120 are driven to rotate in this state, the shutter blades are rotated with an aperture angle $\theta_{OP}$ of 180°. Because the aperture angle $\theta_{OP}$ is 180°, the opened state is obtained during the half of the period of one revolution of the shutter blades and light is blocked during the remaining half period. The state shown in FIG. 8A corresponds to the state offering the highest aperture ratio.

FIG. 8B shows an example in which two shutter blades 110 and 120 are overlapped by a 90°-area. If two shutter blades 110 and 120 are driven to rotate in this state, the shutter blades are rotated with the aperture angle $\theta_{OP}$ of 90°. Because the aperture angle $\theta_{OP}$ is 90°, the opened state is obtained during the quarter of the period of one revolution of the shutter blades and light is blocked during the remaining three-quarter period.

FIG. 8C shows an example in which two shutter blades 110 and 120 are completely expanded. If two shutter blades 110 and 120 are driven to rotate in this state, the shutter blades are rotated with the aperture angle $\theta_{OP}$ of 0°. Because the aperture angle $\theta_{OP}$ is 0°, light is completely blocked by the shutter blades.

FIGS. 9A to 9D are diagrams showing timings in imaging in which two shutter blades 110 and 120 shown in FIG. 7 and FIGS. 8A to 8C are disposed on the optical path in front of the imaging element 2. In the example of FIGS. 9A to 9D, the frame rate (FPS) is set to 60.

Figure 9A:
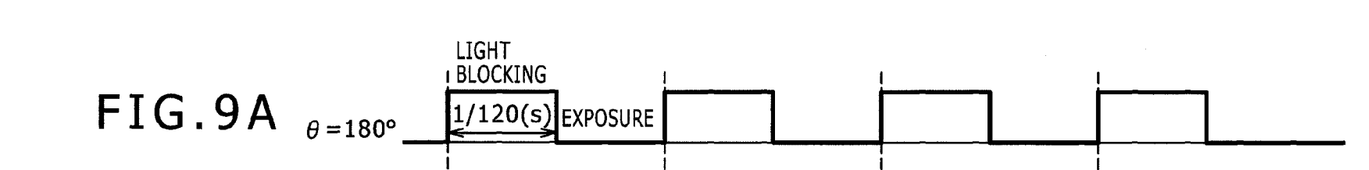
FIGS. 9A to 9D are timing diagrams showing examples of the imaging timing (FPS=60, θ=180°) with the structure example of FIG. 7.

FIG. 9A shows an example in which two shutter blades 110 and 120 are so overlapped as to have the same angle range as shown in FIG. 8A to thereby set the aperture angle $\theta_{OP}$ to 180° and the shutter blades 110 and 120 are rotated one revolution every time one frame is imaged by the imaging element. In the example of FIG. 9A, 1/120 seconds as the half of the one-frame period (1/60 seconds) corresponds to a light-blocking period, and the 1/120 seconds as the remaining half corresponds to an exposure period for the imaging element.

Figure 9B:
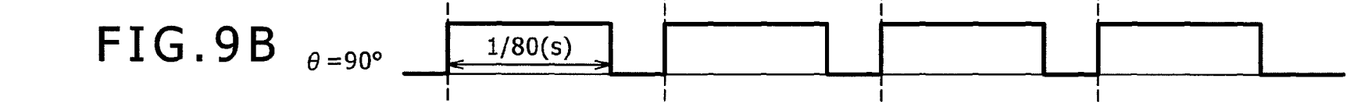

FIG. 9B shows an example in which two shutter blades 110 and 120 are set as shown in FIG. 8B to thereby set the aperture angle $\theta_{OP}$ to 90° and the shutter blades 110 and 120 are rotated one revolution every time one frame is imaged by the imaging element. In the example of FIG. 9B, 1/80 seconds as the three quarters of the one-frame period (1/60 seconds) corresponds to a light-blocking period, and the remaining quarter period corresponds to an exposure period for the imaging element.

Figure 9C:
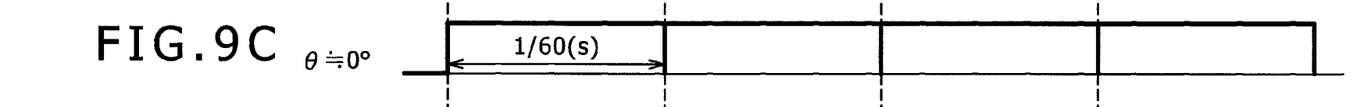

FIG. 9C shows an example in which two shutter blades 110 and 120 are set as shown in FIG. 8C to thereby obtain the relationship of aperture angle $\theta_{OP} \approx 0°$ (this indicates the state in which the aperture angle $\theta_{OP}$ is very close to 0°, in this example) and the shutter blades 110 and 120 are rotated one revolution every time one frame is imaged by the imaging element. In the example of FIG. 9C, exposure is carried out for a very short time at the end of the one-frame period and light is blocked during the remaining period, and a very-high-speed electronic shutter is set.

Figure 9D:
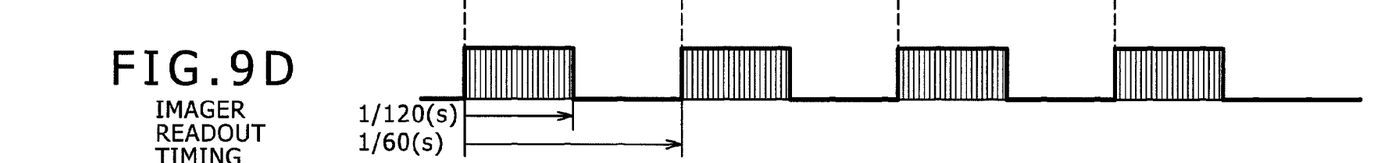

As shown in FIG. 9D, irrespective of the length of the set light-blocking period, readout of an imaging signal from the imaging element is carried out during 1/120 seconds as the first half of the one-frame period so that the imaging signal may be read out in the light-blocking period.

FIGS. 10A to 10D are diagrams showing timings in imaging in which two shutter blades 110 and 120 shown in FIG. 7 and FIGS. 8A to 8C are disposed on the optical path in front of the imaging element 2 and the frame rate (FPS) is set to 30.

Figure 10A:
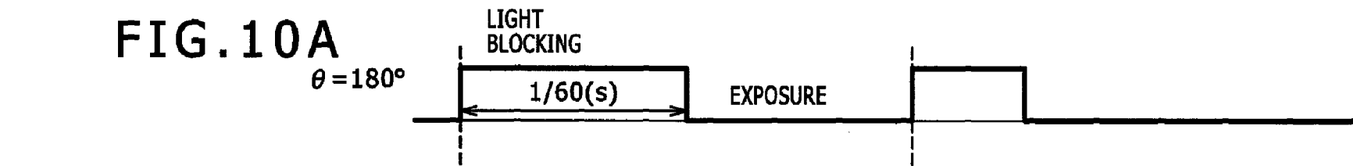
FIGS. 10A to 10D are timing diagrams showing examples of the imaging timing (FPS=30, θ=180°) with the structure example of FIG. 7.

FIG. 10A shows an example in which the aperture angle $\theta_{OP}$ is set to 180°. In the example of FIG. 10A, 1/60 seconds as the half of the one-frame period (1/30 seconds) corresponds to a light-blocking period, and the 1/60 seconds as the remaining half corresponds to an exposure period for the imaging element.

Figure 10B:
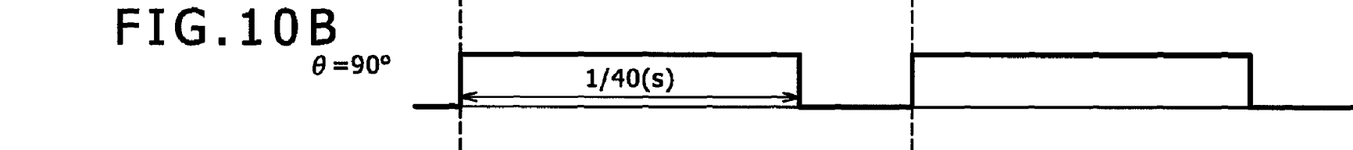

FIG. 10B shows an example in which the aperture angle $\theta_{OP}$ is set to 90°. In the example of FIG. 10B, 1/40 seconds as the three quarters of the one-frame period (1/30 seconds) corresponds to a light-blocking period, and the remaining quarter period corresponds to an exposure period for the imaging element.

Figure 10C:
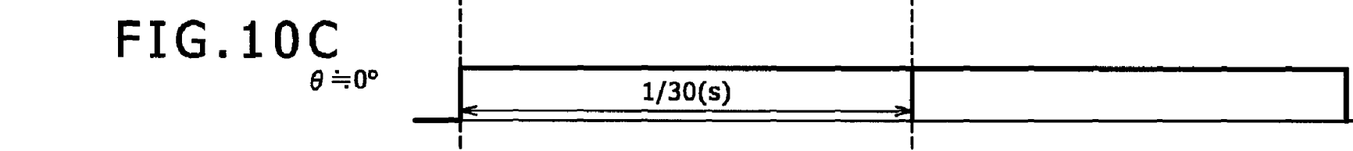

FIG. 10C shows an example in which the aperture angle $\theta_{OP}$ is set to almost 0°. In the example of FIG. 10C, exposure is carried out for only a very short time at the end of the one-frame period and light is blocked during the remaining period, and a very-high-speed electronic shutter is set.

Figure 10D:
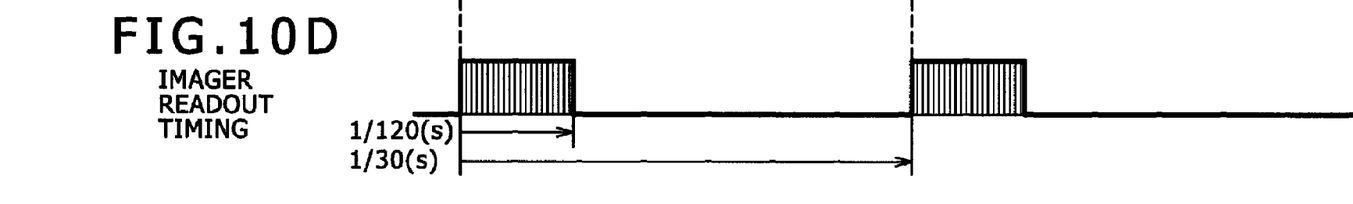

As shown in FIG. 10D, irrespective of the length of the set light-blocking period, readout of an imaging signal from the imaging element is carried out during 1/120 seconds in the first half of the one-frame period so that the imaging signal may be read out in the light-blocking period.

As above, if the shutter blades 110 and 120 each having a light-blocking angle of 180° are prepared and imaging is so carried out that the angle formed by these two shutter blades 110 and 120 is adjusted, the aperture ratio is 50% even in the states of FIG. 9A and FIG. 10A, which correspond to the highest aperture ratio. Therefore, when the FPS is 60, the lowest shutter speed provides 1/120 seconds as the exposure time in one frame. When the FPS is 30, the lowest shutter speed provides 1/60 seconds as the exposure time in one frame. These exposure times are not sufficient.

In order to solve such a problem, it will be possible that, as described in Patent Document 2, the number of shutter blades is increased to three and the light-blocking period is adjusted by controlling the rotation cycle of these three shutter blades, for example. However, increasing the number of shutter blades makes the mechanism more complex, unfavorably.

The present embodiment is to propose an imaging device including shutter blades that have a solution to this problem.

[Description of Shutter Mechanism of Present Embodiment]

Details of the shutter mechanism of the present embodiment, incorporated in the imaging device shown in FIG. 1, will be described below with reference to FIGS. 2 to 4C.

Figure 2:
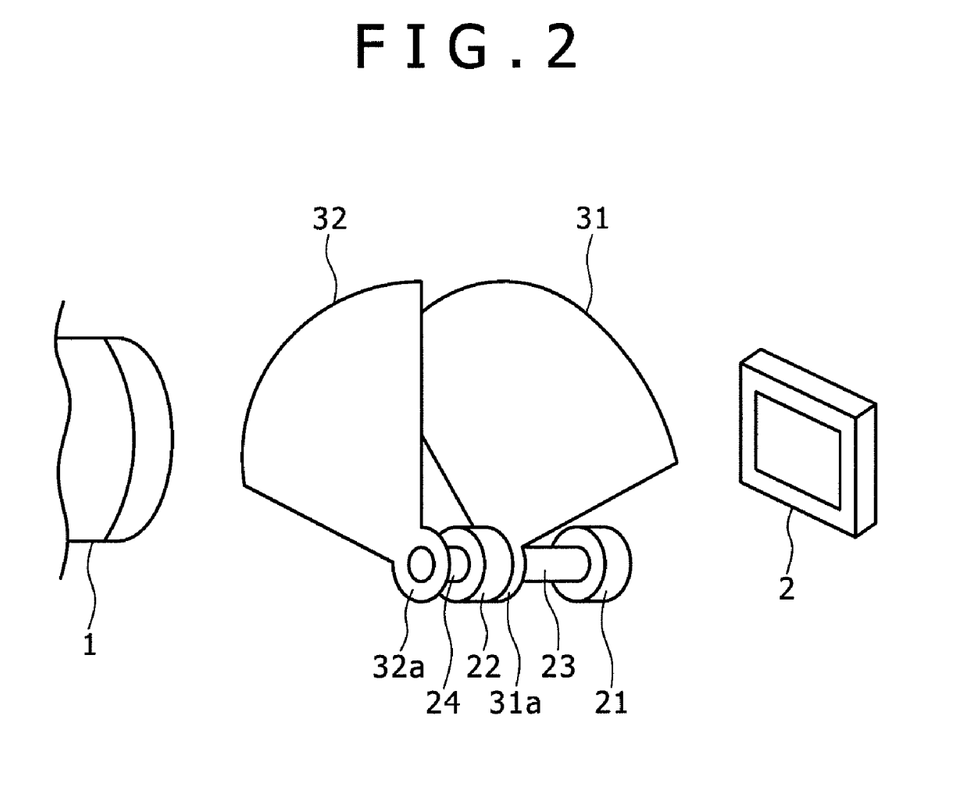
FIG. 2 is an explanatory diagram showing a structure example of shutter blades according to one embodiment of the present invention.

FIG. 2 is a diagram showing the state in which the shutter blades 31 and 32 with the structure of the present embodiment are disposed on the optical path. The light-blocking angle of each of two shutter blades 31 and 32 of the present example is set to 90°.

As shown in FIG. 2, a rotation center 31a of the first shutter blade 31 is connected to the first motor 21 via a rotation shaft 23, and the first shutter blade 31 is driven to rotate by this first motor 21. A second motor 22 is attached to the first shutter blade 31. A rotation center 32a of the second shutter blade 32 is connected to this second motor 22 via a rotation shaft 24. The rotation shaft 23 and the rotation shaft 24 are coaxially disposed.

The first motor 21 is formed of e.g. a motor that revolves in response to voltage application, and drives the rotation of the first shutter blade 31 and the second shutter blade 32 attached to the first shutter blade 31. The second motor 22 is formed of e.g. a stepping motor, and revolves by the angle dependent on an applied signal to thereby adjust the angular position of the second shutter blade 32 relative to the first shutter blade 31.

As shown in FIG. 2, two shutter blades 31 and 32 block light by passing through the optical path between the back end of the lens barrel 1 and the light receiving plane of the imaging element 2 in their rotation. When the blades 31 and 32 do not exist on the optical path, the opened state is obtained and thus the imaging element 2 is exposed.

Figure 3:
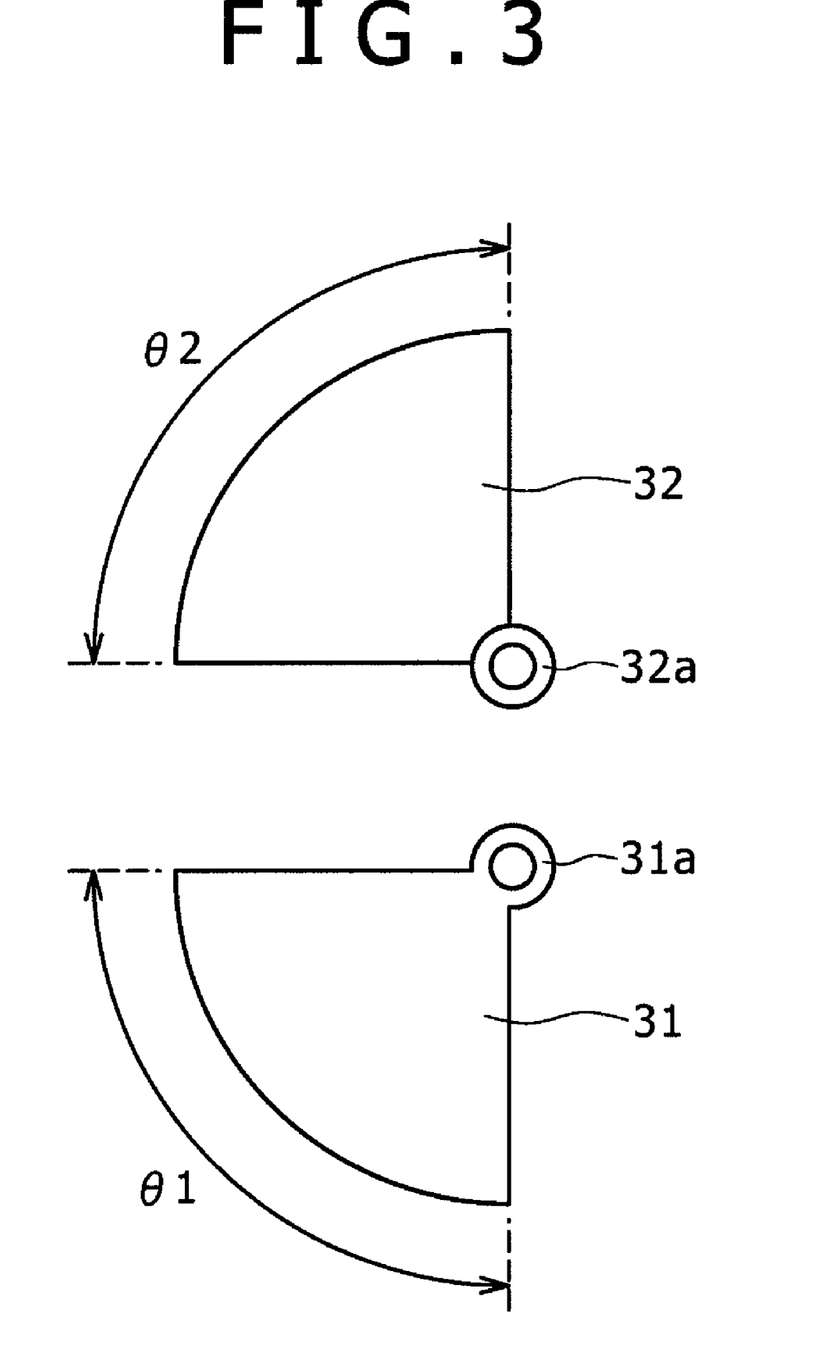
FIG. 3 is an exploded explanatory diagram showing the shutter blades according to one embodiment of the present invention.

FIG. 3 is an exploded diagram of two shutter blades 31 and 32. In the representation of FIG. 3, the rotation centers 31a and 32a of the shutter blades 31 and 32 are separated from each other.

The first shutter blade 31 has a quarter circle shape whose light-blocking angle $\theta1$ is 90°. The second shutter blade 32 also has a quarter circle shape whose light-blocking angle $\theta2$ is 90°.

Figure 4A:
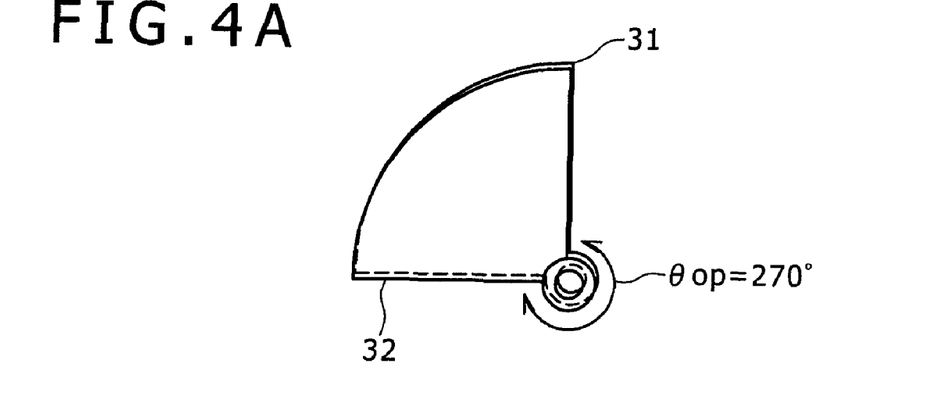
FIGS. 4A to 4C are explanatory diagrams showing examples of the angle formed by two shutter blades according to one embodiment of the present invention.
Figure 4B:
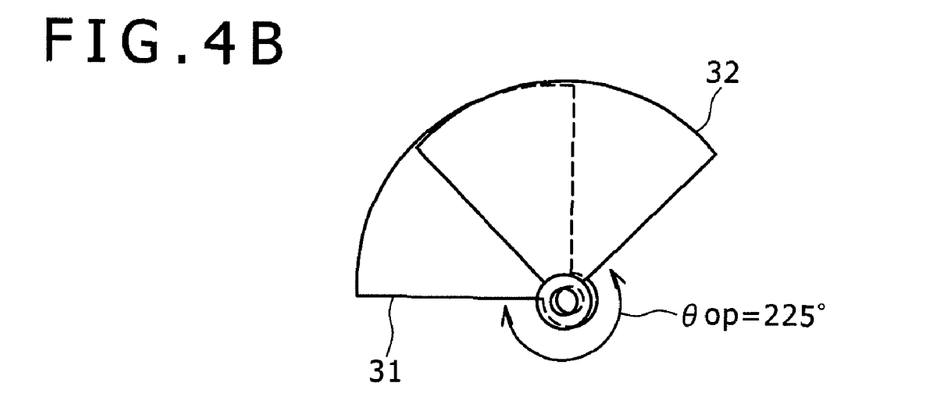
Figure 4C:
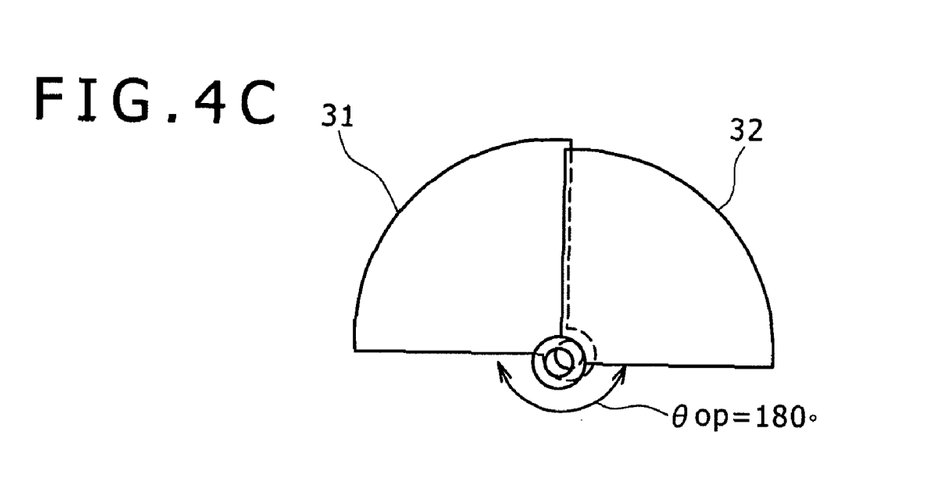

Examples in which the light-blocking angle and the aperture angle are changed by these shutter blades 31 and 32 of the present example are shown in FIGS. 4A to 4C. The processing of changing the light-blocking angle and the aperture angle is executed through control of the driving of the second motor 22 by the shutter controller 5 shown in FIG. 1. In FIGS. 4A to 4C, two shutter blades 31 and 32 are so shown as to be slightly shifted from each other for the description. However, they are so disposed as to be overlapped on the same axis in practice.

FIG. 4A shows an example in which two shutter blades 31 and 32 are so overlapped as to have the same angle range. If two shutter blades 31 and 32 are driven to rotate in this state, the shutter blades are rotated with the aperture angle $\theta_{OP}$ of 270°. Because the aperture angle $\theta_{OP}$ is 270°, the opened state is obtained during three quarters of the period of one revolution of the shutter blades and light is blocked during the remaining quarter period. The state shown in FIG. 4A corresponds to the state offering the highest aperture ratio.

FIG. 4B shows an example in which two shutter blades 31 and 32 are partially overlapped and the aperture angle $\theta_{OP}$ is set to 225°. Because the aperture angle $\theta_{OP}$ is 225°, the opened state is obtained during 5/8 of the period of one revolution of the shutter blades and light is blocked during the remaining 3/8 period.

FIG. 4C shows an example in which two shutter blades 31 and 32 are completely expanded. If two shutter blades 31 and 32 are driven to rotate in this state, the shutter blades are rotated with the aperture angle $\theta_{OP}$ of 180°. Because the aperture angle $\theta_{OP}$ is 180°, the opened state is obtained during the half of the period of one revolution of the shutter blades and light is blocked during the remaining half period.

[Examples of Imaging State of Present Embodiment]

With reference to FIGS. 5A to 5F and FIGS. 6A to 6E, a description will be made below about examples of imaging operation in the imaging device having the configuration of FIG. 1, in which the shutter blades 31 and 32 having the structure shown in FIGS. 2 to 4C are incorporated.

FIGS. 5A to 5F and FIGS. 6A to 6E show examples in which the shutter blades 31 and 32 are rotated with a cycle of one revolution per one frame.

Figure 5A:
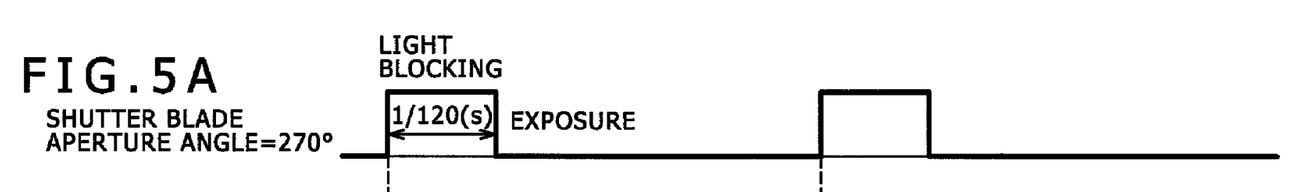
FIGS. 5A to 5F are timing diagrams showing examples of the imaging timing (FPS=30, θ=270°) according to one embodiment of the present invention.

In the examples of FIGS. 5A to 5F, the FPS as the frame frequency is set to 30 and the aperture angle $\theta_{OP}$ of the shutter blades 31 and 32 is set to 270°. As shown in FIG. 5A, the first 1/120 seconds in each frame period corresponds to a light-blocking period by the shutter blades 31 and 32, and the remaining 1/40 seconds corresponds to an exposure period, during which the optical path is not blocked.

FIGS. 5B to 5E show examples of the electronic shutter control condition in the imaging element, settable based on the rotation of the shutter blades 31 and 32. Specifically, the imaging element 2 shown in FIG. 1 can control the period for accumulating a light reception signal through reception of an instruction about the timing of the exposure start in each frame from the imaging element controller 7. Processing based on such control is referred to as the electronic shutter.

Each of the pulses shown in FIGS. 5B to 5E indicates the exposure start. The signal accumulated in the imaging element 2 before the supply of the pulse is discarded, and the period from the timing of the supply of the pulse, which indicates the exposure start, to the end of the frame period serves as an exposure period. The signal accumulated in each frame period is sequentially read out for each horizontal line in an imager readout period at beginning part of the next frame period, shown in FIG. 5F. This imager readout period is set within the period during which the imaging element is shielded from light by the shutter blades 31 and 32, shown in FIG. 5A.

Figures 5B, 5C, 5D:
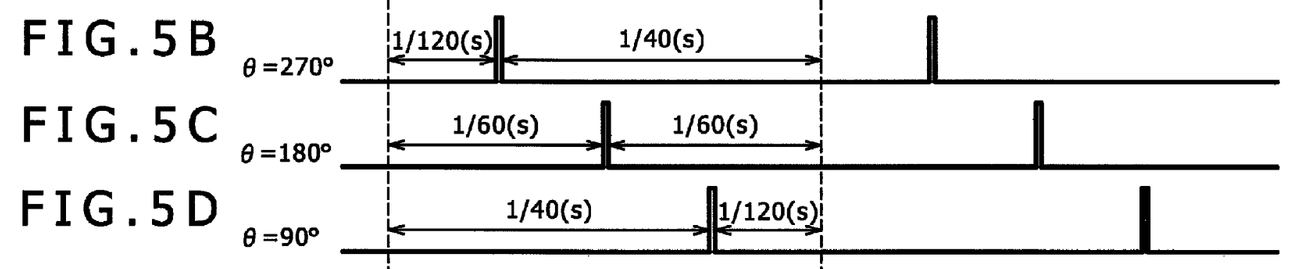

The respective conditions about the setting of the timing of the electronic shutter will be described below. As shown in FIG. 5B, if the exposure rate of the imaging element in one frame period is set to 3/4, the exposure start pulse is generated at the timing of the end of the light blocking by the shutter blades 31 and 32. In this case, the exposure time in one frame is 1/40 seconds, which is equivalent to the state in which an electronic shutter with a shutter release time of 1/40 seconds is set.

FIG. 5C shows an example in which the exposure rate in one frame period is set to 1/2. In this example, the exposure start pulse is generated after the elapse of 1/60 seconds from the start of the frame period. In this case, the exposure time in one frame is 1/60 seconds, which is equivalent to the state in which an electronic shutter with a shutter release time of 1/60 seconds is set.

FIG. 5D shows an example in which the exposure rate in one frame period is set to 1/4. In this example, the exposure start pulse is generated after the elapse of 1/40 seconds from the start of the frame period. In this case, the exposure time in one frame is 1/120 seconds, which is equivalent to the state in which an electronic shutter with a shutter release time of 1/120 seconds is set.

Figure 5E:
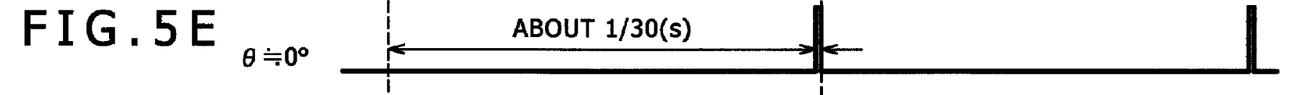
Figure 5F:
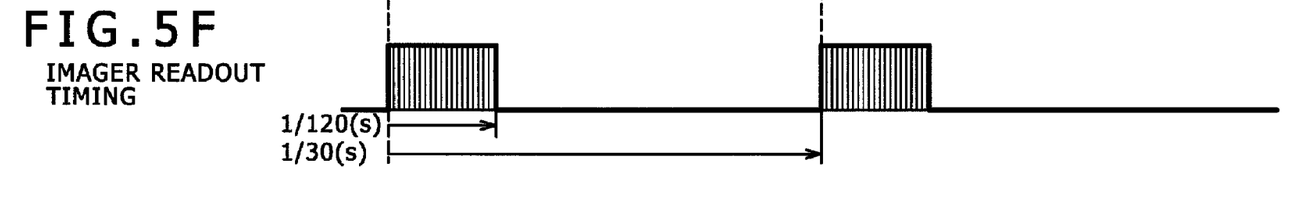

FIG. 5E shows an example in which the exposure rate in one frame period is set to almost zero. In this example, the exposure start pulse is generated after the elapse of about 1/30 seconds from the start of the frame period, so that a very short exposure period is set. This is equivalent to the state in which a very-high-speed electronic shutter is set.

In the examples of FIG. 6, the FPS as the frame frequency is set to 60 and the aperture angle $\theta_{OP}$ of the shutter blades 31 and 32 is set to 180°. As shown in FIG. 6A, the first 1/120 seconds in each frame period corresponds to a light-blocking period by the shutter blades 31 and 32, and the remaining 1/120 seconds corresponds to an exposure period, during which the optical path is not blocked.

Figure 6A:
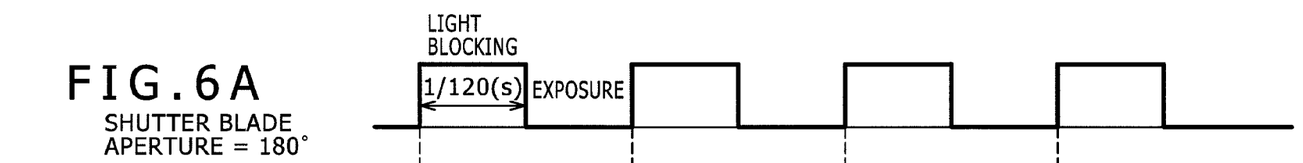
FIGS. 6A to 6E are timing diagrams showing examples of the imaging timing (FPS=60, θ=180°) according to one embodiment of the present invention.
Figures 6B, 6C:
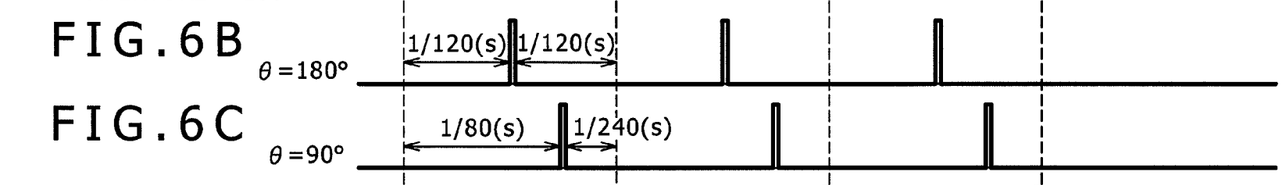
Figure 6D:
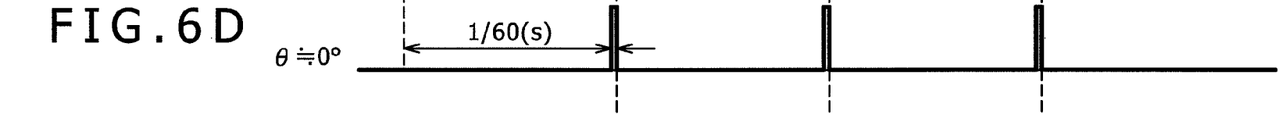
Figure 6E:
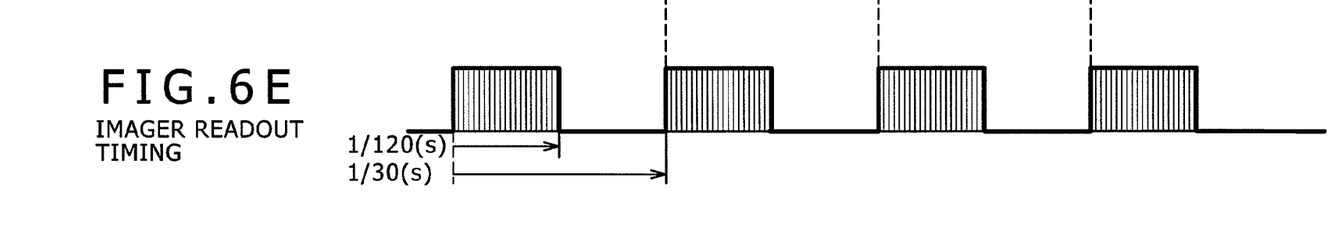

FIGS. 6B to 6D show examples of the electronic shutter control condition in the imaging element, settable based on the rotation of the shutter blades 31 and 32.

Each of the pulses shown in FIGS. 6B to 6D indicates the exposure start. The period from the timing of the supply of the pulse, which indicates the exposure start, to the end of the frame period serves as an exposure period. The signal accumulated in each frame period is sequentially read out for each horizontal line in an imager readout period at beginning part of the next frame period, shown in FIG. 6E. This imager readout period is set within the period during which the imaging element is shielded from light by the shutter blades 31 and 32, shown in FIG. 6A.

The respective conditions about the setting of the timing of the electronic shutter will be described below. As shown in FIG. 6B, if the exposure rate of the imaging element in one frame period is set to 1/2, the exposure start pulse is generated at the timing of the end of the light blocking by the shutter blades 31 and 32. In this case, the exposure time in one frame is 1/120 seconds, which is equivalent to the state in which an electronic shutter with a shutter release time of 1/120 seconds is set.

FIG. 6C shows an example in which the exposure rate in one frame period is set to 1/4. In this example, the exposure start pulse is generated after the elapse of 1/80 seconds from the start of the frame period. In this case, the exposure time in one frame is 1/240 seconds, which is equivalent to the state in which an electronic shutter with a shutter release time of 1/240 seconds is set.

FIG. 6D shows an example in which the exposure rate in one frame period is set to almost zero. In this example, the exposure start pulse is generated after the elapse of about 1/60 seconds from the start of the frame period, so that a very short exposure period is set. This is equivalent to the state in which a very-high-speed electronic shutter is set.

As is apparent from FIGS. 5A to 5F and FIGS. 6A to 6E, the flexibility in the settable frame rate and electronic shutter speed is enhanced by preparing the shutter blades 31 and 32 of the present example and adjusting the angle formed by two shutter blades 31 and 32. Specifically, when a comparatively low frame rate is set, the minimum shutter speed can be set comparatively low by overlapping two shutter blades 31 and 32 with each other to set the aperture angle large (e.g. to 270°) as shown in FIGS. 5A to 5F for example.

On the other hand, when a comparatively high frame rate is set, a comparatively long period can be ensured as the period during which a signal is read out from the imaging element in a light-blocking period made by two shutter blades 31 and 32, by increasing the light-blocking angle formed by the shutter blades. This makes it possible for the imaging device to deal with even the high frame rate.

In this manner, both enhancement in the flexibility in the electronic shutter speed and change in the frame rate can be achieved by preparing two shutter blades 31 and 32 each having a light-blocking angle of 90° according to the present embodiment and allowing adjustment of the angle formed by two shutter blades 31 and 32. This provides an advantage that an imaging device having a frame rate change function can be favorably provided with a mechanical rotational shutter. Comparison with the operation examples with the structure of FIG. 7 makes it apparent that the electronic shutter speed that may be impossible with two shutter blades each having a semicircular shape shown in FIG. 7 can be employed for each of the frame rates.

In the present embodiment, with a simple configuration based on two shutter blades 31 and 32, the exposure aperture angle can be changed within a wide adjustment range of 0° to 270°. In the related arts, in order to obtain the adjustment range of the exposure aperture angle above the range of 0° to 180°, three or more shutter members are needed as described in Patent Document 2 and so on. In contrast, the present embodiment has an advantage that the adjustment range of the exposure aperture angle can be widened with a simpler configuration. Because the configuration can be simplified, cost reduction, weight reduction, and reliability enhancement for the imaging device can be correspondingly achieved. Furthermore, simplification and weight reduction of the structure of the rotational part can reduce the power necessary for the rotational driving, which can achieve reduction in the power consumption of the imaging device. Moreover, it is also possible to easily handle sudden change in the frame cycle, which can widen the range of the video representation.

[Description of Modification Examples of Embodiment]

In the above-described embodiment, two shutter blades are employed and they each have a quarter circle shape (i.e. a central angle of 90°). However, they may have another similar angle and shape. The shapes of two shutter blades do not have to be completely identical to each other unlike those in FIG. 3.

Furthermore, in the above-described embodiment, the motor that defines the angle of the second shutter blade is disposed on the first shutter blade. However, it is also possible to adjust the angle formed by two shutter blades by using another configuration.

Moreover, the driving examples shown in FIGS. 5A to 5F and FIGS. 6A to 6E are each a preferred example, and therefore another frame rate, electronic shutter speed, and so on may be set.

The present application contains subject matter related to that disclosed in Japanese Priority Patent Application JP 2008-187842 filed in the Japan Patent Office on Jul. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
an imaging element configured to carry out photoelectric conversion of subject image light incident through a lens and produce an imaging signal;
an imaging controller configured to control readout of the imaging signal from the imaging element and carry out control of change setting of a frame cycle of imaging by the imaging element;
first and second shutter members configured to be disposed on an optical path of image light incident through the lens and be each capable of setting a state in which incident light on the imaging element is blocked and a state in which incident light on the imaging element is not blocked; and
a shutter controller configured to set a timing at which the optical path is blocked by the first shutter member and a timing at which the optical path is blocked by the second shutter member based on a frame cycle and an imaging timing that are set by the imaging controller,
wherein a change of a light-blocking angle and an aperture angle between the first shutter member and the second shutter member is executed by a first motor and a second stepping motor controlled by the shutter controller so as to shift the first shutter member and the second shutter member from each other according to an instruction about the frame cycle and the imaging timing from the imaging controller,
wherein a flexibility in a settable frame rate and an electronic shutter speed is enhanced by preparing the shutter blades and adjusting an angle formed by the two shutter blades,
wherein, when a comparatively low frame rate is set, a minimum shutter speed can be set comparatively low by overlapping the two shutter blades to set the aperture angle to 270 degrees,
wherein, when a comparatively high frame rate is set, a comparatively long period can be achieved as a period during which a signal is read out from the imaging element in a light-blocking period made by the two shutter blades, by increasing the light-blocking angle formed by the shutter blades.

2. The imaging device according to claim 1, wherein
the first and second shutter members rotate about a predetermined rotation axis and are capable of, through rotation, setting a state in which the optical path is blocked and a state in which the optical path is not blocked, and
a state of overlapping between a rotation angle range of light blocking by the first shutter member and a rotation angle range of light blocking by the second shutter member is adjustable.

3. The imaging device according to claim 2, wherein
a first driver by which the first shutter member is driven to rotate is provided and a second driver that adjusts an angular position of the second shutter member relative to the first shutter member is attached to the first shutter member.

4. The imaging device according to claim 2, wherein the first and second shutter members each block light in a rotation angle range of about 90° and collectively block light in a rotation angle range of about 180° if a degree of overlapping between the first shutter member and the second shutter member is lowest.

5. The imaging device according to claim 2, wherein the imaging controller executes processing of reading out a signal arising from light reception of pixels in the imaging element in a period during which light is blocked by the first and second shutter members.

* * * * *